(12) United States Patent
Marmaropoulos

(10) Patent No.: US 6,598,274 B1
(45) Date of Patent: Jul. 29, 2003

(54) ELECTRICALLY RELEASABLE HOOK AND LOOP FASTENER

(75) Inventor: George Marmaropoulos, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/120,910

(22) Filed: Apr. 11, 2002

(51) Int. Cl.[7] .............................................. A44B 18/00
(52) U.S. Cl. ........................... 24/451; 24/442; 428/100
(58) Field of Search ....................... 24/451, 452, 442; 428/100

(56) References Cited

U.S. PATENT DOCUMENTS

| | | | | |
|---|---|---|---|---|
| 4,848,351 A | * | 7/1989 | Finch | 128/640 |
| 6,349,415 B1 | * | 2/2002 | Gong | 2/195.5 |
| 6,451,239 B1 | * | 9/2002 | Wilson | 264/491 |
| 6,468,624 B1 | * | 10/2002 | Fujisawa et al. | 428/100 |

* cited by examiner

Primary Examiner—Robert J. Sandy
Assistant Examiner—André Jackson
(74) Attorney, Agent, or Firm—Aaron Waxler

(57) ABSTRACT

An electrically releasable form of hook and loop fastener allows one half of the fastener to release from the other half without applying direct physical force to either half. The hook elements of the fastener are formed of a shape-memory alloy material such as commercially available Ninitol. Release of the hook half of the fastener from the loop half is accomplished by passing an electrical current through the shape-memory alloy material to straighten the hooks so that they release their engagement with the loops. The flow of electricity through the hook half energizes the Ninitol material to change its shape, either expanding or contracting in length; the change in shape is made to act against another length of material that remains fixed in length or changes shape in an opposite direction so as to cause the hook shape to straighten toward a rod shape. Upon termination of the flow of electrical energy, the hooks return to their hook shape, ready for re-engagement with the loops upon conventional mating of the two halves of the fastener. Release and re-engagement can be repeated, substantially indefinitely.

12 Claims, 3 Drawing Sheets

ELECTRICALLY RELEASABLE HOOK AND LOOP FASTENER

FIELD OF THE INVENTION

This invention relates generally to hook and loop fasteners of the type that are well known and commercially available under the Trademark VELCRO. More specifically, the invention relates to hook and loop fasteners in which the two halves of such a fastener can be released from engagement with each other via external means without the application of direct, external physical force.

DESCRIPTION OF THE INVENTION

Hook and loop fasteners have been well known in the fastener art for many years and they have been used successfully in many and widely diverse applications. The secure engagement of one half to the other and the substantial force required to separate the two halves appear to have contributed significantly to the popularity of this type of fastener. However, the force that must be applied to achieve separation of the two halves, the brief but finite time required to achieve separation, and the incremental or progressive nature of the separation process, have been found to make the separation process difficult and/or unsatisfactory in some instances.

The inherently incremental nature of the known separation process, requiring the two halves to be progressively "peeled" apart, can make the use of hook and loop fasteners unsatisfactory and/or extremely difficult in applications that lack sufficient clearance for a peeling or tilting motion. Similarly, the finite time required to "peel" one half from the other sometimes precludes the use of hook and loop fastenings when relatively "instant" separation, such as the separation of snap fasteners, is required. Hook and loop fasteners designed for "heavy duty" applications with substantial holding force can require similarly substantial separation forces. Separation forces under these circumstances may exceed the physical ability of certain users, thereby further limiting the application of these worthwhile fastening devices.

SUMMARY OF THE INVENTION

The present invention is directed to providing a hook and loop fastener in which the time and force required to separate the two mating halves are reduced to a minimum. This invention is further directed to providing hook and loop fasteners that can be fabricated readily using available materials and known techniques. Another advantage of the hook and loop fastener of this invention is that disengagement of the two halves can be automated if desired. Further, disengagement can even be accomplished remotely, without direct application of external physical force.

Hook and loop fasteners in accordance with this invention can be fabricated in generally conventional manner, but, commercially available "shape-memory" alloy material such as Nitinol must be used to form at least part of the hook elements. Shape-memory alloy material comprises a key element of the hook and loop fastener of this invention.

An important aspect of shape-memory alloy material, also known as "muscle wire," is that it is electrically responsive so as to change its shape when an electrical current flows through it. More specifically, shape-memory alloy material in wire form can be made to contract in length in response to the flow of electricity through the wire. This invention relies on this property of shape-memory alloy wire to allow the two halves of the hook and loop fastener to disengage from each other by passing electrical energy through the hook portion of the fastener. That is, the hooks are caused to straighten so as to loose their "hook" shape when an electrical potential is applied.

By selectively applying electrical energy to cause the hooks to assume a straight-line "memory" shape, the characteristic interlocking engagement of the hooks with the loops is released, and the two halves of the fastener are, in effect, instantly disengaged from each other. In light of this disclosure, it can now be seen that the application of electrical energy to a suitably constructed hook and loop fastener can be made to cause disengagement of the loop portion of such a fastener from the hook portion without the application of external physical force. That is, if desired, disengagement of the fastener assembly can be effected from a remote location using electrical energy only. In this regard, it will be understood that physical displacement generally will be required to achieve actual separation of the two halves of a fastener. In many applications such displacement can be achieved through the force of gravity alone, after the hook elements are "straightened." However, in view of this disclosure, it will be apparent to those having ordinary skill in this art that various different arrangements can be employed utilizing the disengagement method and apparatus of this invention to achieve physical separation of two fastener halves.

In the disclosed embodiment of the invention, a two-part hook and loop fastener assembly of conventional configuration is formed using electrically conductive flexible material for part of the hook elements. More specifically, in the hook element half of the fastener, the hook elements are formed at least in part, of electrically conductive shape-memory alloy material such as Nitinol. It is known that Nitinol in wire or narrow strip shape, can be made to contract in length in response to the flow of electrical current. This invention contemplates the use of this kind of shape-memory alloy wire or strip. Although expansion or contraction of the material is possible, contraction is believed to be the more commonly available and therefore preferable characteristic.

It will be understood readily by those having ordinary skill in this art, that wires or strips made of materials having an expansion or contraction characteristic can be joined in parallel relationship with another "inert" material to form a single element, similar to the bimetallic element of a conventional thermostat. Such an element can be made to distort in a desired manner when one of the two materials contracts or expands. The hook elements of the fastener of this invention are constructed accordingly. That is, the hook-shaped elements are formed of a length of shape-memory material joined in parallel relationship with an inert material, the combination being formed to have the desired hook shape. Accordingly, a normally hook-shaped element having the contracting shape-memory material positioned along the outer curved circumference of the hook shape will tend to straighten into a straight-line or "rod" shape when the flow of electricity through the shape-memory "muscle wire" causes the outer circumference of the hook to shorten from its un-energized length. Shortening the outer circumference of the hook has the effect of "opening" the hook shape by straightening it toward a "rod" shape as the inner and outer circumferences of the hook approach equality in length. Thus, the usual, or non-memory form of the hooks corresponds to the conventional "hook" shape used in hook and loop fasteners, whereas the energized, "memory" shape of the normally hook-shaped elements is that of a substantially straight line or rod, free of any significant hook shape.

It can be seen readily that the substantially straightened rods on the first half of the fastener, free of any reversely bent "hook" shape, will disengage from and be free of locking or fastening engagement with the loop elements of the second half of the fastener. The formed, hook-shape elements are transformed into their straight rod "memory" condition by the flow of electricity through the shape-memory alloy wire material in accordance with the known characteristics of such materials.

In accordance with this invention, the base surface material of the hook half-portion of the fastener preferably will be electrically conductive. Hooks cut and formed of lengths of stock made of two materials joined in the manner herein identified can be produced and anchored in generally upright orientation to a desired base surface using suitable, known fabrication techniques. Techniques for achieving the necessary electrical connection between the shape-memory alloy portion of each hook and the electrically conductive base surface material can be chosen similarly. The choice of techniques used for this purpose will be decided, in most instances, based upon economic considerations. Economic considerations are expected to affect in like manner, the choice of techniques used to facilitate the flow of electricity through the shape-memory alloy material. For example, with the hook portion of the fastener fabricated in accordance with the preceding observations, the loop half of the fastener may be formed of suitable electrically conductive material so that electricity can be made to flow through the hook elements in an electrical path extending from the hook half of the fastener to the conductive material of the loop half-portion.

As an alternative to establishing an electrical path from the hooks to the loops, each hook element may be formed of two separate, electrically-conductive lengths of material that are electrically coupled to each other at the open end of the hook; in this manner, the electrical path through each hook element extends through one of the lengths of material from its base end to its free end and through the other length of material from its free end to its base end. Separate electrical connections to the base end of each of the two lengths of material can be established by various means such as, for example, forming the base surface of the hook portion from a composite sheet material having a first conductive layer and a separate conductive layer separated by an electrically insulating layer, with one of the conductive elements of a hook coupled to the first conductive layer and the other conductive element of the hook coupled to the second conductive layer.

In brief, means are provided for making electrical connections to the two ends of the electrical path, however constituted, so that ultimately, an electrical potential difference is imposed between the ends of the shape-memory alloy portion of each hook. When an electrical potential difference is imposed, the current flowing through the shape-memory alloy material of the hook elements will cause them to assume their shortened, or extended, "memory" condition, thereby straightening and disengaging the hook elements from the loop elements so as to release the two halves of the fastener from each other. Generally, the straightened condition of the hook elements will be maintained by the flow of electricity. If an electrical path is established between the two halves of the fastener, it is apparent that current flow will be interrupted as soon as the two halves have separated. Alternatively, if the electrical path is established within the hooks independently of the loops, then current flow will continue until it is deliberately interrupted as by a switch or the like. Within the field of shape memory material technology, choosing materials having a longer or shorter "recovery time" will determine how long the hooks will remain in substantially straightened condition following the interruption of electrical current flow.

It can now be seen that release of the two fastener halves from engagement with each other can be accomplished without application of any external physical force whatsoever, and accordingly, release can be controlled remotely and, if desired, automatically. All that is required is the application of electrical energy to cause current flow through the muscle wire portion of each hook element in the hook portion of the hook and loop fastener assembly. Preferably, a switch or other suitable means of controlling current flow is connected in series with the electrical path that includes the hook portion of the assembly, so that current flow through the path can be enabled or interrupted, selectively and substantially at will.

These and other features, and advantages of this invention will be made more apparent to those having skill in this art, by reference to the following specification considered in conjunction with the accompanying drawings, in which:

DETAILED DESCRIPTION OF THE PREFERRED EMBODIMENT

In the following description, certain specific details of the disclosed embodiment such as circuits, interconnections, materials and techniques, etc, are set forth for purposes of explanation rather than limitation, so as to provide a clear and thorough understanding of the present invention. However, it should be understood readily by those skilled in this art, that the present invention may be practiced in other forms and embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

Figure 1:
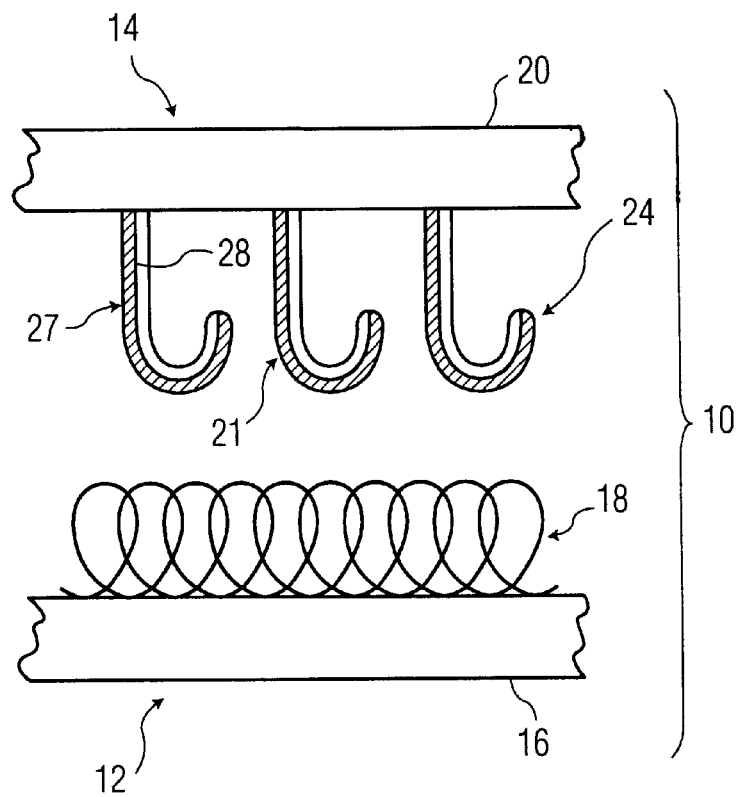
FIG. 1 is a simplified, partial side elevation view of the two halves of a hook and loop fastener assembly in accordance with this invention; [view A]

Referring now to the drawings, the hook and loop fastener assembly 10 of FIG. 1 may be seen to comprise a loop half-portion 12 and a mating, hook half-portion 14. Loop half-portion 12 in this case incorporates loop base surface 16 having a plurality of loop elements 18 extending substantially normally therefrom. The mating hook half-portion 14 of assembly 10 incorporates a hook base surface 20 having a plurality of hook elements 21 extending substantially normally therefrom.

The shape and overall function of loop elements 18 are typical of the conventional structure of the loop half-portions and loop elements of known hook and loop fasteners; accordingly, these aspects of this structure will not be described in detail herein. In this regard, it should be noted that each loop element 18 is characterized by an open center portion 26 defined by the surrounding "loop" shape. And, it should be understood further that loop elements 18 may be formed and attached to loop base 16 in various, well known manners, such as a mass of interconnected helical loops of fibrous material fastened to the base 16, as shown in the drawings or, individual loop shapes may formed integrally with the material of loop base 16 by known fabricating and/or molding processes.

In turn, each hook element 21 of hook portion 14 extends from a fixed end 22 to a free end 23 at the open end 25 of hook shape 24, remote from fixed end 22. Fixed end 22 is attached to and extends from hook base surface 20. In the conventional manner of hook and loop fasteners, hook-shapes 24 extend into and between loop elements 18 when hook portion 14 is urged into opposed, substantially abutting relationship with loop portion 12. When the two fastener half-portions 12, 14 are urged toward each other, at least some of the hook shapes 24 at the free ends 23 of hooks 21 pass through and become entangled in the open portions 26 of loops 18 as shown in FIG. 1, thereby "locking" the two halves 12, 14 of fastener assembly 10 together, in a well-known manner.

In accordance with established prior art practice, separation of half-portions 12, 14 can be achieved by applying sufficient physical force in opposite directions to pull the two parts away from each other. Separation in this manner "unbends" the resiliently flexible hook shapes 24 until they straighten enough to slip out of the open centers 26 of loops 18. This is the conventional and well-known method of operation of hook and loop fasteners. With proper selection of known and available materials, the hook and loop fastener of this invention will separate in accordance with the prior art as well as in accordance with the invention herein disclosed.

In accordance with this invention, loop portion 12 may formed of electrically conductive material so that an electrical current path can be established incorporating hooks 21 and loop half portion 12. That is, loop half portion 12 having base surface 16 with a plurality of loop elements 18 extending in substantially normal relationship therefrom, may be formed as a unitary structure of electrically conductive material. Alternatively, if desired, loop half portion 12 can be made of a non-conductive material that has been coated with a conductive material, provided that problems involving abrasion and eventual wearing away of the conductive coating are overcome satisfactorily. And as will be disclosed herein, loop portion 12 may remain entirely non conductive in accordance with another embodiment of the invention. A consistent requirement for each form of loop portion 12 is a reasonable flexibility of the loops 18 as well as base surface 16 so that engagement and disengagement of the mated halves 12, 14 of the fastener assembly 10 can be accomplished as intended.

Figure 3:
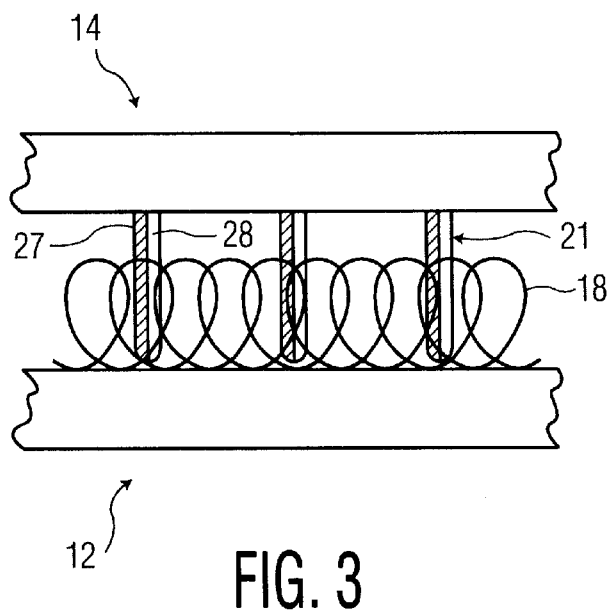
FIG. 3 is a partial side elevation view of the hook and loop fastener assembly of FIG. 1, showing the appearance of the fastener in response to the flow of electricity therethrough; [view C]
Figure 4:
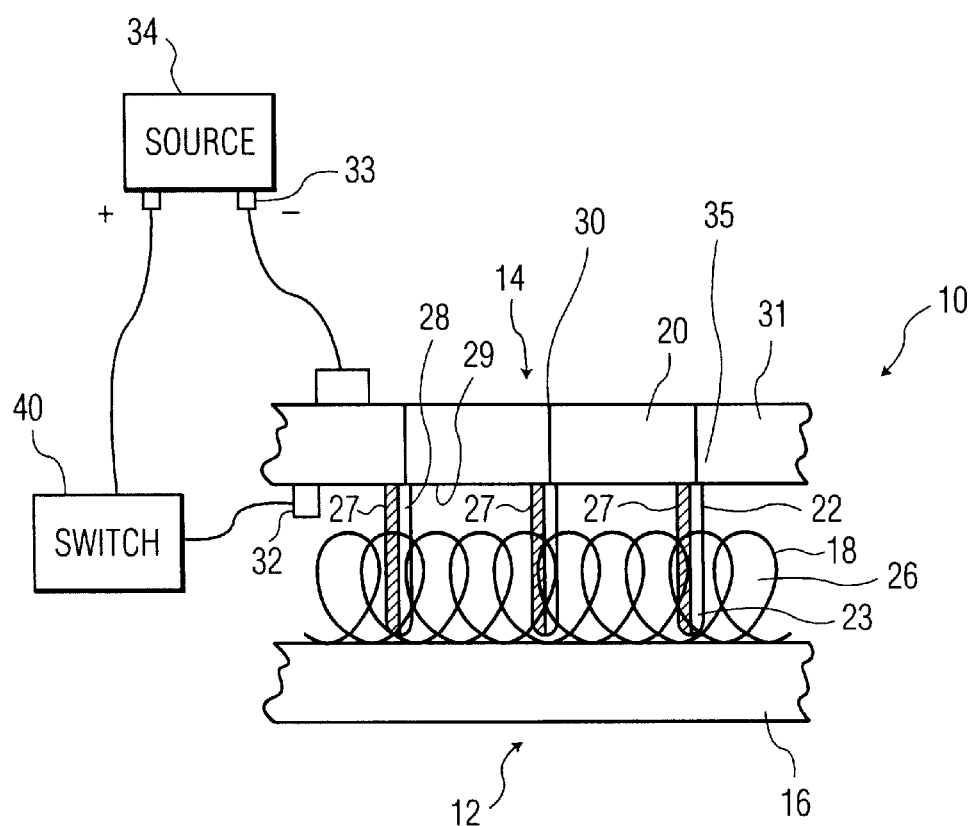
FIG. 4 is a simplified side view of the hook and loop fastener of this invention showing details of a corresponding electrical circuit; and, FIG. 5 is a simplified side view of another embodiment of the hook and loop fastener of this invention showing a modified electrical circuit.

The structure and function of hook portion 12 defines the significant aspects of this invention, in that hook elements 21 are constructed so as to straighten in response to the flow of electrical current through the hook. In accordance with this invention, at least part of each hook element 21 is formed of shape-memory alloy material such as Nitinol, which is frequently identified as "muscle wire". It is a known characteristic of shape-memory material that it may be made so as to expand or contract in response to electrical energy. In wire form, shape-memory material accordingly may either shorten or elongate in response to the application of an electrical potential. In this invention, generally flexible and electrically conductive shape-memory wire is incorporated into hook elements 21 in the hook shape shown in FIGS. 1 and 2. Hook elements are configured, as explained in the following, so that when an electrical potential is applied between the free end 23 and the fixed end 22 of element 21, the element will substantially straighten from the hook shape 24, shown in FIGS. 1 and 2, to the generally straight-rod shape extending between fixed ends 22 and free ends 23 of hook elements 21, as shown in FIGS. 3 and 4.

Hook elements 21 of this invention utilize the expansion/contraction characteristics of shape-memory wire to alter the shape of the elements from the usual hook shape to a substantially straight rod shape in response to the flow of electrical energy. This is accomplished in a manner akin to the operation of a thermal bimetallic element responding to heat energy.

Figure 2:
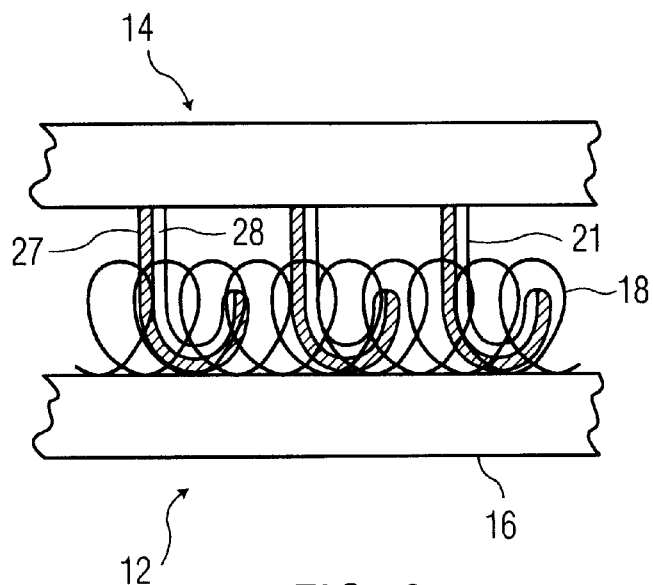
FIG. 2 is a partial side elevation view of the hook and loop fastener halves of the assembly of FIG. 1, shown in engaged relationship; [view B]

As shown most clearly in FIG. 2, the composite body of each hook element 21 comprises a first length of flexible shape-memory wire or strip material 27, coupled in side-by-side parallel relationship with a second length of preferably different flexible material 28. In repose, that is in the absence of electrical energy, the composite body maintains its "hook" shape. Upon application of an electrical potential difference between the fixed end 22 and the free end 23 of shape-memory length 27, expansion or contraction of length 27 acts against the relatively fixed-length curvature of material length 28 to cause the curvature to straighten into or near straight-rod shape. The straightening need only be enough to permit hooks 24 to loose their "grip", that is their engagement within the open centers 26 of loops 18.

Specifically if "muscle wire" of the type that contracts in response to electrical energy is being used for element 27, hook elements 21 will be configured so that shape memory material length 27 is positioned proximate the outer curved edge of hook shape 24; then, the length of material 27, representing the outer circumference of the curved hook shape 24, will grow shorter in response to the flow of electricity, while the dimension of inner length 28 will remain unchanged. Accordingly, hook shape 24 will straighten as the dimensions of its inner and outer circumferences approach equality.

With reference to expansion and/or contraction of the shape memory material, it should now be recognized that shape-memory wire or strip that elongates in response to electrical energy, can be adopted for use in place of, or in combination with, material that contracts, by using the shape-memory material for the inner curvature portion of hook shape 24 instead of, or in combination with, the outer curvature portion. A combined use of expansion-type material for the inner curvature of the hook shape, with contraction-type material for the outer curvature of the hook shape, may be particularly effective when added force is required for heavy duty applications or when particularly stiff flexible materials are employed.

As suggested previously herein, and as illustrated in FIG. 4 of the drawings, electrical connector means 30, 32 are associated with hook fastener half-portion 14 for imposing an electrical potential difference from an electrical power source 34 between the fixed end 22 and the free end 23 of shape memory material length 27 of hook elements 21. That is, the source of electricity 34 is connected in series with an electrical on-off control switch 40, and both source 34 and switch 40 in turn are connected in series, via electrical connector means 32,33, with the electrical path that includes the length of shape memory material 27, such that the electrical paths represented by hook elements 21 lies between switch 40 and source 34.

With reference to the electrical coupling of connector means 32, 33, to hook elements 21, it should be understood that the "ends" of the electrically conductive material does not necessarily require connections at the actual physical extremities of the material and connections proximate the ends thereof generally will be acceptable for the purposes herein disclosed. The electrical connector means 32,33 may be of any suitable and known form of electrical connector, including both separable connectors and terminal connectors. If separable connectors are used it will be understood that only one half of each of two connectors need be coupled to the fastener of this invention, while the remaining half of each separable connector is reserved for establishing electrical connections with external devices, sources and/or equipment.

To provide for electrical coupling to hooks 21 when length 28 comprises conductive material connected in series with length 28 at the free ends thereof, base 20 of hook portion 14 may comprise a composite having a first conductive sheet or layer 29 separated and electrically insulated from a second conductive sheet 30 by an intermediate insulating sheet or layer 31. With hook elements 21 mounted to this form of base 20, apertures 35 formed in top sheet 29 allow extensions of conductive material length 28 to extend through sheet 29 without electrical contact so that they can extend into electrical contact with second conductive sheet 30. Conductive shape memory length 27 of each hook element 21 similarly contacts sheet 29 directly. Accordingly, electrical connector means 32 coupled to sheet 29 and electrical connector means 33 coupled to sheet 30, readily allow an electrical potential difference to be imposed between the fixed ends 22 of conductive lengths 27, 28 of hook elements 21.

In this embodiment of the invention, as shown in FIG. 4, a source of electricity 34 is connected in series with an electrical on-off control switch 40 and both source 34 and switch 40 in turn are connected via electrical connector means 32,33, in series with the path defined by lengths 27, 28 of hook elements [21] and conductive sheets 29, 30.

Figure 5:
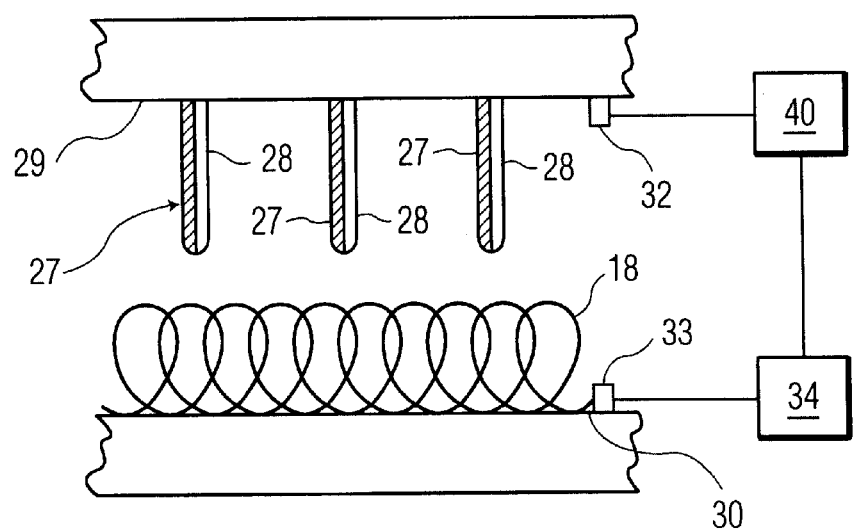

In the alternative embodiment of the invention illustrated in FIG. 5, hook elements 21 incorporate only a single length of conductive material 27, as previously described herein, and loop elements 18 are formed of electrically interconnected continuous coils of conductive material such as wire that, accordingly, provides an exposed conductive surface for the conductive surface of the hook elements to engage. In this embodiment of the invention, base 20 of hook portion 14 incorporates at least a single sheet of conductive material 29 electrically connected to shape material lengths 27 of hooks 21, with electrical connector means 32 electrically connected to sheet 29 so that one side of an electrical source 34 may be connected to lengths 27 of hooks 21. Further, base surface 16 of loop portion 14 may either incorporate a separate single sheet of conductive material 30 electrically coupled to loop elements 18 and to connector means 33, or, conductive sheet 30 may be avoided entirely and electrical connector means 33 may be connected directly to conductive loops 18, to complete the electrical connection to the second side of electrical source 34.

As in the operation of the embodiment of the invention illustrated in FIG. 4, in the embodiment of FIG. 5 as well, a source of electricity 34 is connected in series with an electrical on-off control switch 40 and both source 34 and switch 40 in turn are connected in series, in this case, with the path defined by hook elements [21] and loop elements [18] via electrical connector means 32,33.

Although a preferred embodiment of the method and apparatus of this invention has been illustrated and described, those having skill in this art will recognize that various other forms and embodiments now may be envisioned readily without departing significantly from the spirit and scope of the invention disclosed herein and set forth in the accompanying claims.

What is claimed is:

1. An electrically releasable hook and loop fastener assembly comprising:

a loop fastener half-portion having a loop fastener base with a plurality of loop elements extending therefrom;

a hook fastener half-portion having a hook fastener base with a plurality of hook elements extending therefrom;

said hook elements having a fixed end mounted to said hook fastener base and a free end, remote from said fixed end, defining a hook shape;

said hook elements being dimensioned to mechanically engage said loop elements when said loop fastener half-portion and said hook fastener half-portion are pressed into contact with each other;

said hook elements comprising a first length of flexible material and a second length of flexible, electrically responsive and electrically conductive shape-memory material of the type that changes from a first configuration to a second configuration in response to electrical current flow therethrough;

means associated with at least said hook fastener half-portion for applying an electrical potential difference between said fixed end and said free end of said hook elements; and, said length of shape-memory material being positioned to substantially straighten said hook shape in response to change in shape of said shape-memory material upon application of an electrical potential difference between the ends thereof.

2. The electrically releasable hook and loop fastener assembly of claim 1, further comprising:

electrical connector means electrically coupled to at least said hook fastener half-portion of said fastener assembly to form an electrical series circuit with said hook element between them.

3. The electrically releasable hook and loop fastener assembly of claim 1, wherein said first and second lengths of material are coupled together in parallel abutting relationship.

4. The electrically releasable hook and loop fastener assembly of claim 3, wherein said second length of material is electrically conductive and said second length of material is electrically insulated from said first length of material along the lengths thereof, said first and second lengths of material being electrically coupled to each other to form a series circuit, proximate the said free end of said hook element.

5. The electrically releasable hook and loop fastener assembly of claim 1, wherein said first length of material is shape-memory material of the type that contracts in response to the flow of electricity;

said second length of material is shape memory material of the type that elongates in response to the flow of electricity;

electrically conductive material associated with said hook surface base, said electrically conductive material being electrically connected to said fixed end of said shape-memory material of each of said hook elements; and, a first electrical connection site coupled to said electrically conductive material on said hook surface base and a second electrical connection site coupled to said electrically conductive surface of said loop elements, for causing an electrical current flow through said shape-memory material between said fixed and said free end of each of said hook elements when said hook elements are in electrical and physical contact with said loop elements.

6. An electrically releasable hook and loop fastener assembly in accordance with claim 4, further comprising:

first electrical connector means electrically coupled to said fixed end of said first length of material, and second electrical connector means electrically coupled to said fixed end of said second length of material.

7. An electrically releasable hook and loop fastener assembly in accordance with claim 5, further comprising:

first electrical connector means electrically coupled to said fixed end of said first length of material, and second electrical connector means electrically coupled to said fixed end of said second length of material.

8. The electrically releasable hook and loop fastener assembly of claim 1, wherein said loop elements have an electrically conductive surface thereon for electrically contacting said first length of material of said hook elements when said first and second half-portions of said connector assembly are urged into engagement with each other.

9. The electrically releasable hook and loop fastener assembly of claim 1, wherein said loop elements comprise continuous electrically interconnected coiled wires for electrically engaging said conductive first length of material, when said first and second half-portions of said connector assembly are urged into engagement with each other.

10. An electrically releasable hook and loop fastener assembly in accordance with claim 7, further comprising:

first electrical connector means electrically coupled to said fixed end of said first length of material, and second electrical connector means electrically coupled to said loop elements.

11. An electrically releasable hook and loop fastener assembly in accordance with claim 8, further comprising:

first electrical connector means electrically coupled to said fixed end of said first length of material, and second electrical connector means electrically coupled to said loop elements.

12. A system for electrically releasing hook and loop fastener halves from engagement with each other, said system comprising:

a loop fastener half-portion having a loop fastener base with a plurality of loop elements extending therefrom;

a hook fastener half-portion having a hook fastener base with a plurality of hook elements extending therefrom;

said hook elements having a fixed end mounted to said hook fastener base and a free end, remote from said fixed end, defining a hook shape;

said hook elements being dimensioned to mechanically engage said loop elements when said loop fastener half-portion and said hook fastener half-portion are pressed into contact with each other;

said hook elements comprising a first length of flexible material and a second length of flexible, electrically responsive and electrically conductive shape-memory material of the type that changes from a first configuration to a second configuration in response to electrical current flow therethrough;

said length of shape-memory material being positioned to substantially straighten said hook shape in response to change in shape of said shape-memory material upon application of an electrical potential difference between the ends thereof;

electrical on-off control switch means and a source of electrical energy connected in series with each other and with said first length of shape-memory material to form an electrical path through said first length of material when said switch is on and to interrupt said electrical path when said switch is off; and, means associated with at least said hook fastener half-portion for applying an electrical potential difference between said fixed end and said free end of said hook elements.

* * * * *